United States Patent

Daniel

[11] Patent Number: 6,129,340
[45] Date of Patent: Oct. 10, 2000

[54] GUIDE DEVICE FOR PULLEY BLOCK

[76] Inventor: L. R. Daniel, P.O. Box 837, Battleboro, N.C. 27809

[21] Appl. No.: 09/199,211

[22] Filed: Nov. 24, 1998

Related U.S. Application Data

[60] Provisional application No. 60/072,755, Jan. 27, 1978.
[51] Int. Cl.$^7$ ....................................................... B66D 1/36
[52] U.S. Cl. .................................................. 254/134.3 PA
[58] Field of Search ................................. 254/134.3 PA, 254/403, 411, 134.3 R

[56] References Cited

U.S. PATENT DOCUMENTS

| | | | |
|---|---|---|---|
| 926,878 | 7/1909 | Kelley | 254/411 |
| 1,630,517 | 5/1927 | Berger | 254/411 |
| 1,676,460 | 7/1928 | Reid | 254/411 |
| 2,254,828 | 9/1941 | Linn | 254/411 |
| 3,077,337 | 2/1963 | Cronkright | 254/134.3 PA |
| 4,018,422 | 4/1977 | Bozeman | 254/134.3 PA |

*Primary Examiner*—Robert C. Watson
*Attorney, Agent, or Firm*—Clifford F. Rey

[57] ABSTRACT

A guide device for use with a pulley block of the type utilized by utility lineman during installation of an electrical power line is disclosed. The guide device is a generally C-shaped member having inwardly converging curved leg members projecting from a body portion thereof. The guide device is permanently captured within the pulley block in its functional position wherein the C-shaped body member engages the pulley wheel to prevent a lightweight feeder line extending through the pulley block from slipping off the pulley wheel and becoming jammed in the installation process. Thus, the present guide device eliminates the need for repeated climbing of the power pole by the lineman during the process of feeding the power line through the pulley block thereby providing obvious economic advantages.

7 Claims, 3 Drawing Sheets

GUIDE DEVICE FOR PULLEY BLOCK

CROSS-REFERENCE TO RELATED APPLICATION

This Application claims the benefit under 35 U.S.C. 119 (e) of U.S. Provisional Application No. 60/072,755 filed Jan. 27, 1998 by L. R. Daniel for Guide Device For Pulley Block.

BACKGROUND OF INVENTION

Field of Invention

The present invention relates generally to pulley blocks and, more particularly, to a guide device for a pulley block utilized by a lineman for installing electrical power lines on a power pole.

During the installation of electrical power lines on a power pole, it is necessary for a lineman to climb each pole and to thread a rope through a special type of pulley block designed for this purpose. The rope is dispensed from a large spool carried on a truck and may be a mile or more in length. The rope is attached at one end thereof to the power line to be installed. An opposite leading end of the rope must be threaded through a pulley block mounted on the cross member of each pole in preparation for the power line installation.

The present invention has been developed to provide a guide device which will enable the lineman to feed such rope through the pulley block from ground level without repeatedly climbing the power pole to untangle the rope in the process.

SUMMARY OF THE INVENTION

After much study of the above problem, the present invention has been developed to provide a guide device specifically for pulley blocks which are utilized by a lineman during installation of an electrical power line onto a utility power pole. During the power line installation procedure the lineman climbs each power pole in the path of the power line to perform a so-called framing procedure of the power pole in advance of the actual installation of the power line. Briefly, the lineman attaches one or more specially designed pulley blocks which will eventually receive the power line to a cross member on the upper portion of the power pole.

Thereafter, the lineman inserts a so-called feeder line of a light weight material through the pulley block such that the feeder line extends from the ground surface upwardly through the pulley block and again down to ground level where it is tied off for later use.

Later in the installation process one end of the feeder line is secured to a leading edge of a rope attached to the power line such that the rope may be drawn up the power pole through the pulley block and downward again to the ground surface by pulling on the previously installed feeder line.

A problem occurs during the installation procedure when a pulley block must be mounted at an acute angle to accommodate a turn in the path of the power line along a curve in the roadway for example. In this instance the small diameter feeder line tends to become jammed in the pulley block causing the lineman to again climb the pole to untangle the feeder line to complete the procedure.

Thus, the present guide device has been designed for use in combination with the angulated pulley block to alleviate this problem.

In view of the above it is an object of the present invention to provide a guide device for use with a pulley block of the type utilized to install electrical power lines on a utility power pole.

Another object of the present invention is to provide such a guide device which can be detachably installed in the pulley block when such pulley block must be disposed at an acute angle to the horizontal in order to accommodate a change in the direction of a path of the power line.

Another object of the present invention is to provide a guide device for a pulley block which will prevent a light weight feeder line extending there through from becoming entangled in the pulley block thereby requiring the lineman to repeatedly climb a power pole to untangle it.

Another object of the present invention is to provide a guide device for a pulley block which will reduce the labor costs incurred by the power company as a result of repeatedly climbing a power pole during the installation process.

Another object of the present invention is to provide a guide device for a pulley block of a unitary construction, which is fabricated from readily available materials and which can be conveniently installed on the pulley block without modification thereof Other objects and advantages of the present invention will become apparent and obvious from a study of the following description and the accompanying drawings which are merely illustrative of such invention.

BRIEF DESCRIPTION OF THE DRAWINGS

The novel features of the present invention are set forth in the appended claims. The invention itself, however, as well as other features and advantages thereof will be best understood by reference to the following detailed description of an illustrative embodiment when read in conjunction with the accompanying figures wherein:

DETAILED DESCRIPTION OF THE PREFERRED EMBODIMENT

Prior to discussing the details of the present invention it may be beneficial to briefly review the standard procedure for installing an electrical power line on a power pole.

Figure 1:
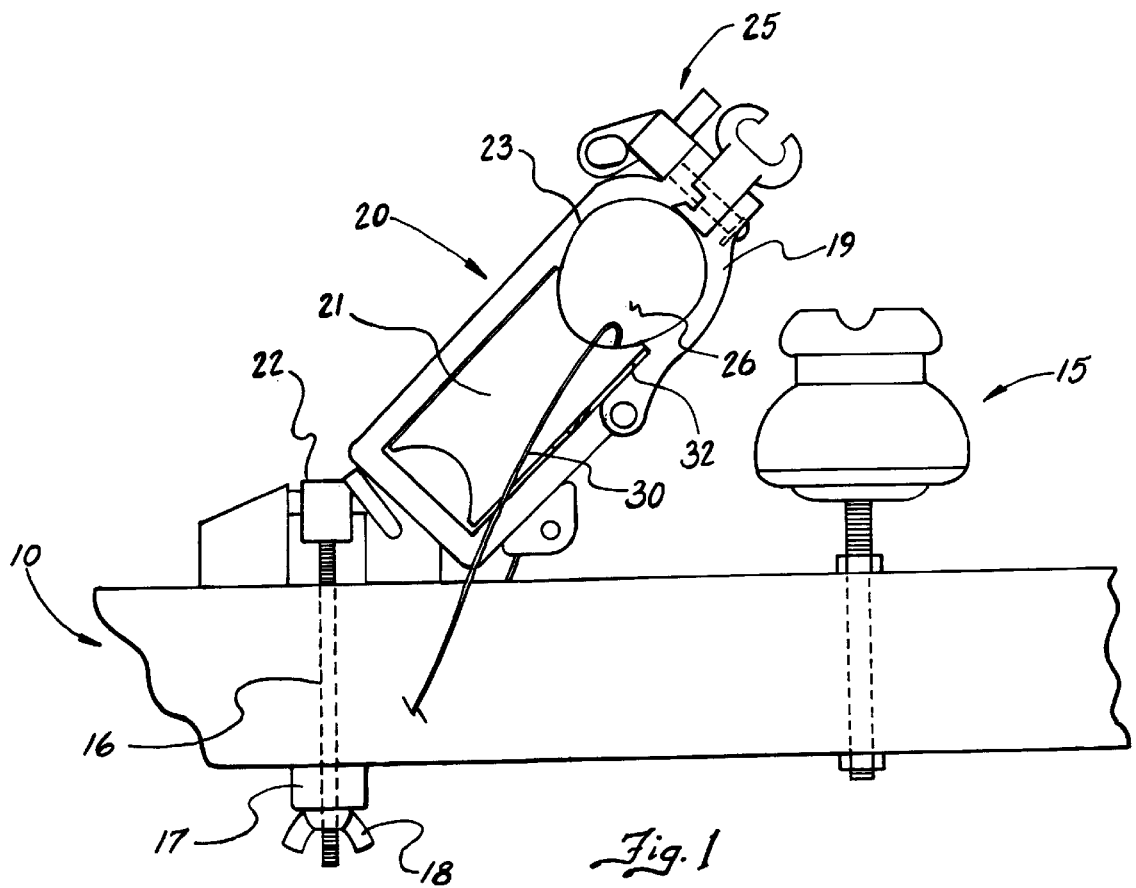
FIG. 1 is a side elevational view of a pulley block assembly of the type utilized to install an electrical power line shown installed on the cross-member of a utility power pole and labeled PRIOR ART.

With reference to the drawings there is shown therein a partial elevational view of the upper portion of a power pole including a horizontal cross member, indicated generally at 10 and illustrated in FIG. 1.

The cross member 10 includes an insulator post, indicated generally at 15, whereon the power line (not shown) will be installed.

A pulley block assembly, indicated generally at 20, of the type traditionally utilized for power line installation is also mounted on the cross member 10 using suitable attaching hardware. A pulley block of the type manufactured by Sherman and Reilly, Inc., Chattanooga, Tenn. is suitable for this purpose.

Since such pulley blocks are well known to those skilled in the art, further detailed discussion of the same is not deemed necessary.

Such a pulley block assembly 20 is of a special design featuring a hinged gate 18 capable of being opened and closed by a locking mechanism 25 to permit the power line (not shown) to be shifted onto the insulator post once it has been drawn through the pulley block 20 and adjusted to the proper position and so-called sag condition as between adjacent power poles (not shown).

The pulley block assembly 20 also includes an angulating base plate 22 for positioning the pulley block assembly 20 at the proper angle for installing the power line when its path changes direction as explained hereinafter in further detail.

During the installation of a power line over extended distances, a so-called framing procedure is performed on each power pole along the path of the power line. This framing procedure requires that a lineman climb each pole and attach a pulley block assembly 20 to the cross member 10 for each power line to be installed thereon. The lineman attaches the base plate 22 to the cross member 10 using suitable attaching hardware such as bolts 16, clamp members 17 and wing nuts 18.

The pulley block assembly 20 is secured in a pre-selected position relative to base 22 being either perpendicular to the plane of the cross member 10 or at a 45° angle in either direction depending on the course the power line is to travel between adjacent poles. For example, if the power line is to follow the turns along a roadway the pulley block assembly 20 must be angulated away from the centerline of the road so that the power line can be drawn through the pulley wheel 21 without damaging the insulation on the power line or the internal wire core.

Thus, it will be appreciated by those skilled in the art that if a power line were pulled under tension through a vertically mounted pulley block assembly 20 and turned to follow the curvature of a roadway, the external surface of the power line would tend to scrape against the upper portion of the block as at 23 causing damage to the external surface of the power line. It is for this reason that the pulley block assembly 20 is installed at a 45° angle to horizontal whenever the path between adjacent poles changes direction.

After the installation of the pulley block assembly 20 is completed, the lineman inserts a lightweight feeder line 30 through the top opening 26 in the pulley block assembly 20 routing both ends of the line 30 to the ground where they are tied off for later use. This completes the so-called framing procedure for the power pole.

Thereafter, as the installation of the power line proceeds, a lead rope (not shown) which may be over a mile in length will be threaded through each pulley block assembly 20 on each pole in advance of the actual power line to pull the power line 80 to 100 feet up the pole and through the pulley block 25 for installation.

In order to pull the lead rope through each pulley block assembly 20 the lineman ties a first end of feeder line 30 to the lead rope and pulls the opposite end of the line 30 downwardly over the pulley wheel 21 to raise the lead rope up the pole from ground level. This procedure presents a problem if the pulley block assembly 20 is installed at the 45° angle position. Still referring to FIG. 1, it can be seen that the line 30 tends to roll off of the curved surface of the pulley 21 to become tangled in the gap 32 between the side edge of the pulley 21 and the gate 18 adjacent thereto.

Figure 2:
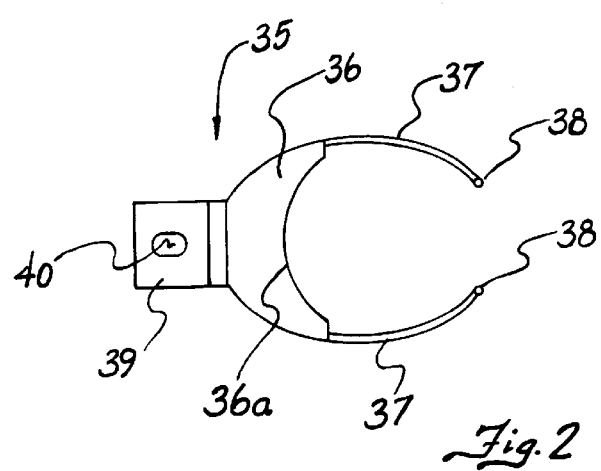
FIG. 2 is a plan view of the guide device of the present invention for use in combination with the pulley block depicted in FIG. 1.

Thus, the guide device 35 of the present invention as shown in FIG. 2 has been devised to alleviate this problem.

The guide device 35 includes structures providing a means for preventing entanglement of the line 30 as it passes through the pulley block assembly 20 installed at such a 45° angle position. Such structures integrally form, for example, entanglement preventing means including those hereinafter described. The guide device 35 includes a body member 36 having a pair of curved leg members 37 extending therefrom in a generally inverted C-shaped configuration. The terminal ends of each leg portion include a ball tip 38.

In the preferred embodiment the guide device 35 is of a unitary construction being fabricated from a thermoplastic material by an injection molding process.

Since such an injection molding process is well known to those skilled in the art, further detailed discussion of the same is not deemed necessary.

Figure 3:
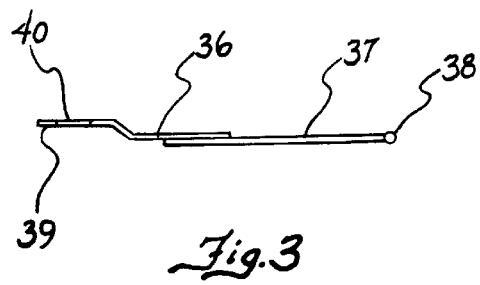
FIG. 3 is a side elevational view of the guide device of the present invention.

As seen in FIG. 3 the body portion 36 is integrally molded with an off-set mounting tab 39 having a slot 40 formed therein. This off-set configuration of the body member 36 and the tab 39 adapts the guide device 35 for installation within the pulley block 20 as shown in FIG. 5.

Figure 4:
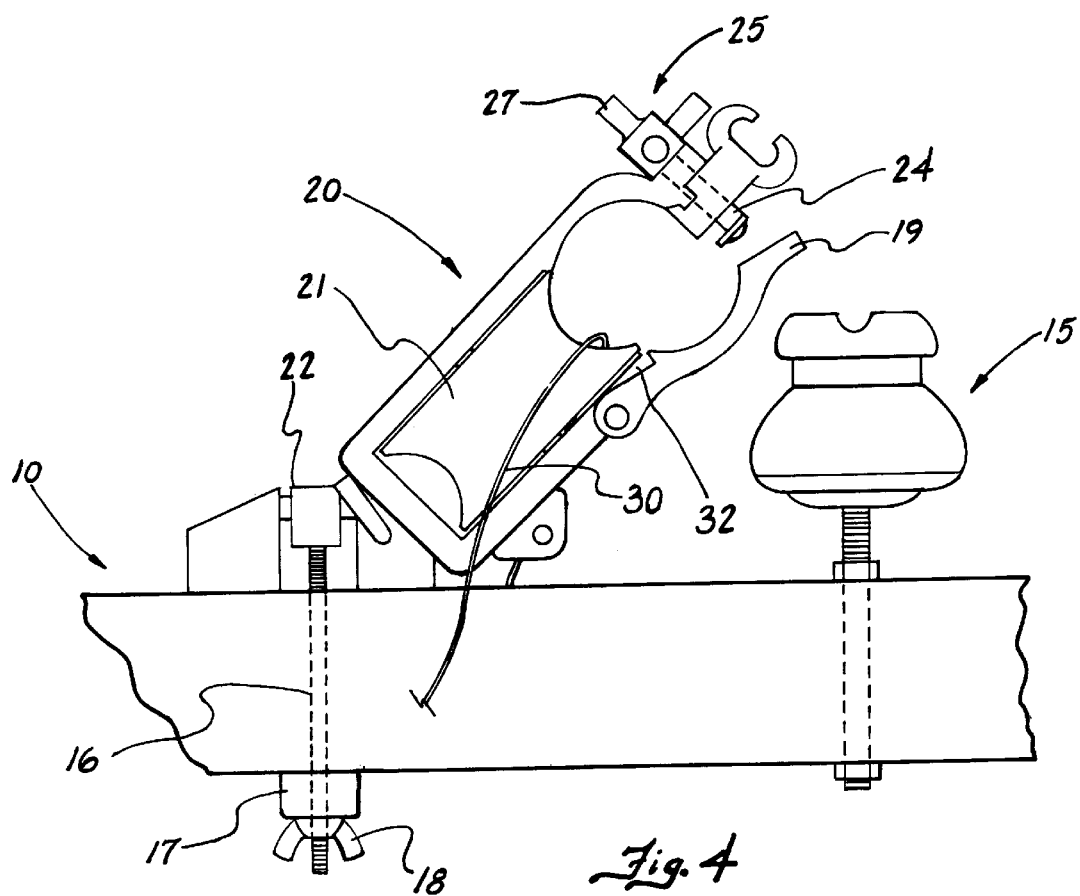
FIG. 4 is a perspective view of the pulley block used in combination with the guide device of the present invention in an open condition.

To use the present guide device the pulley block 20 is opened by releasing the locking mechanism, indicated generally at 25. This is accomplished by rotating the handle 27 of the locking mechanism 90° to a position of disengagement from the hinged gate 19 as shown in FIG. 4. Thereafter, the guide device 35 is installed on the pulley wheel 21 by spreading the ball tips 38 apart and encircling the pulley wheel 21 with the leg members 37.

Figure 5:
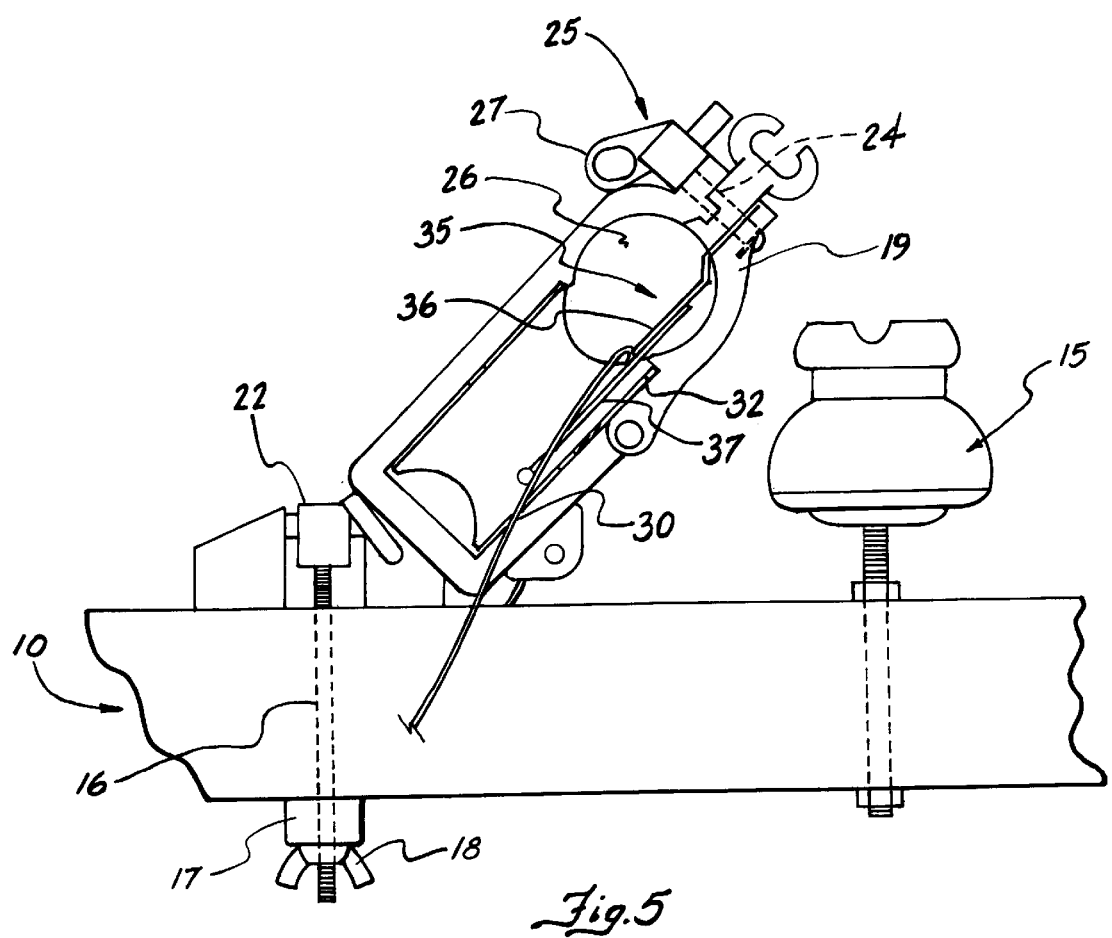
FIG. 5 is a perspective view of the pulley block of FIG. 4 showing the guide device installed therein in a closed condition.

Next, the slide bolt 24 is inserted through the slot 40 and the locking mechanism 25 is rotated 90° in the reverse direction to a position of engagement as shown in FIG. 5.

In the position shown in FIG. 5 it will be noted that a concave portion 36a of the body member 36 is juxtaposed to the inner surface of the pulley wheel 21 covering the gap 32 adjacent the upper part of the pulley. In addition, the legs 37 extend around the circumference of the radiused surface of the pulley wheel 21 such that the ball tips 38 are biased against the pulley wheel 21 to prevent the line 30 from becoming entangled as it is pulled from below to draw a lead rope (not shown) attached to the power line through the top opening 26 during installation.

At a later time when the actual power line (not shown) has been pulled through the pulley block 20 and is ready for installation on the insulator post 15, the lineman will climb the pole and again open the gate 19 to transfer the power line to the insulator post 15.

At this time the guide device 35 is retrieved and the entire pulley block assembly 20 is removed from the cross member 10 and stored for future use.

From the above it can be seen that the guide device of the present invention provides a simple and practical technique for preventing the feeder line 30 from becoming entangled during the so-called framing procedure of a power pole and the subsequent pulling of the lead rope attached to the power line through the pulley block from ground level. The guide device can be manufactured at a relatively low cost and utilized by a lineman to reduce labor costs associated with re-working the framing set up if the lead line becomes entangled and fails to function properly.

The terms "upper", "lower", "side", and so forth have been used herein merely for convenience to describe the present invention and its parts as oriented in the drawings. It is to be understood, however, that these terms are in no way limiting to the invention since such invention may obviously be disposed in different orientations when in use.

Although not specifically illustrated in the drawings, It should be understood that additional equipment and structural components will be provided as necessary, and that all of the components described above are arranged and supported in an appropriate fashion to form a complete and operative guide device for a pulley block incorporating features of the present invention.

The present invention may, of course, be carried out in other specific ways than those herein set forth without departing from the spirit and essential characteristics of such invention. The present embodiments are, therefore, to be considered in all respects as illustrative and not restrictive, and all changes coming within the meaning and equivalency range of the appended claims are intended to be embraced therein.

What is claimed is:

1. A guide device in combination with a pulley block having a rotatable pulley wheel of the type utilized for the installation of electrical power lines on utility poles, said pulley block including a hinged gate portion for releasing said power line from said pulley block during installation thereof, said guide device comprising:

entanglement preventing means disposed within said pulley block including a substantially C-shaped member having flexible, curved leg members projecting therefrom in converging relation, said leg members being radially disposed about a peripheral surface of said pulley wheel.

2. The guide device of claim 1 wherein said mounting means includes an offset mounting bracket integrally formed with said body member for attachment to said pulley block enabling said guide device to be permanently captured within said pulley block to prevent entanglement of said feeder line being passed therethrough.

3. The guide device of claim 1 wherein said C-shaped body member includes spherical tip portions integrally formed at the terminal ends of said curved leg members.

4. The guide device of claim 3 wherein said device is a unitary construction fabricated from a flexible, plastic material.

5. An improved pulley block including a pulley wheel mounted therein of the type utilized for installing electrical power lines on a utility pole, said improvements comprising:

entanglement preventing means adapted for removable attachment to said pulley block including a substantially C-shaped body member having a pair of inwardly converging leg members projecting therefrom, said leg members being radially disposed about said pulley wheel and functioning to prevent a lightweight feeder line being passed therethrough from becoming entangled in said pulley block.

6. The improved pulley block of claim 5 wherein said C-shaped member includes an offset mounting means integrally formed therewith to provide a mechanical attachment to said pulley block such that said entanglement preventing means is permanently captured within said pulley block.

7. The improved pulley block of claim 6 wherein said entanglement preventing means is a unitary construction fabricated from a flexible, plastic material.

* * * * *